(12) United States Patent
Stuhlmueller

(10) Patent No.: US 7,178,348 B2
(45) Date of Patent: Feb. 20, 2007

(54) REFRIGERATION POWER PLANT

(75) Inventor: Franz Stuhlmueller, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 140 days.

(21) Appl. No.: 10/509,359

(22) PCT Filed: Mar. 17, 2003

(86) PCT No.: PCT/DE03/00857

§ 371 (c)(1),
(2), (4) Date: Sep. 24, 2004

(87) PCT Pub. No.: WO03/083268

PCT Pub. Date: Oct. 9, 2003

(65) Prior Publication Data

US 2005/0223728 A1    Oct. 13, 2005

(30) Foreign Application Priority Data

Mar. 28, 2002 (DE) .............................. 102 14 183

(51) Int. Cl.
F25B 1/00 (2006.01)

(52) U.S. Cl. .................. 62/115; 62/238.3; 60/39.3
(58) Field of Classification Search ............... 62/238.3, 62/115, 283.3; 60/39.3, 793, 39.34, 775
See application file for complete search history.

(56) References Cited

U.S. PATENT DOCUMENTS

| | | | |
|---|---|---|---|
| 2,548,508 A | 4/1951 | Wolfner | |
| 3,041,853 A | 7/1962 | Harwich | |
| 3,778,347 A * | 12/1973 | Girabs et al. | 376/217 |
| 3,881,004 A * | 4/1975 | Kelly et al. | 423/235 |
| 4,785,622 A * | 11/1988 | Plumley et al. | 60/39.12 |
| 4,942,734 A | 7/1990 | Markbreiter et al. | |
| 5,025,631 A * | 6/1991 | Garbo | 60/655 |
| 5,449,568 A * | 9/1995 | Micheli et al. | 429/20 |
| 5,555,738 A * | 9/1996 | DeVault | 62/238.3 |
| 6,260,346 B1 * | 7/2001 | Jansson et al. | 60/780 |
| 6,279,312 B1 * | 8/2001 | Hennecke | 60/39.3 |
| 6,574,962 B1 * | 6/2003 | Hsu | 60/649 |
| 6,584,793 B2 * | 7/2003 | Fukushima et al. | 62/238.3 |
| 6,651,443 B1 * | 11/2003 | Meckler | 60/783 |

FOREIGN PATENT DOCUMENTS

| | | |
|---|---|---|
| DE | 695 08 181 T2 | 9/1999 |
| DE | 198 31 425 A1 | 1/2000 |
| JP | 11-324794 A * | 11/1999 |

OTHER PUBLICATIONS

C.D. Moné, D.S. Chau, P.E. Phelan, "Economic Feasibility of Combined Heat and Power and Absorption Refrigeration with Commercially Available Gas Turbines", Energy Conversion and Management, 2001, pp. 1559-1573, vol. 42, No. 13, Elsevier Science Publishers, Oxford, GB.

"Mit Wärme Kühlen", BWK Brennstoff Warme Kraft, pp. 26-27, vol. 51, Nr ½ VDI Verlag GMBH, Dusseldorf, Germany.

* cited by examiner

Primary Examiner—Mohammad M. Ali

(57) ABSTRACT

The invention relates to a power station comprising at least one steam turbine and/or gas turbine which is connected to at least one absorption type refrigeration machine in order to produce refrigeration, whereby the absorption type refrigeration machine is operated by means of steam which is taken from the steam turbine, or by means of waste heat produced by the gas turbine.

8 Claims, 2 Drawing Sheets

REFRIGERATION POWER PLANT

CROSS REFERENCE TO RELATED APPLICATION

This application is the US National Stage of International Application No. PCT/DE03/00857, filed Mar. 17, 2003 and claims the benefit thereof. The International Application claims the benefits of German Patent application No. 10214183.5 DE filed Mar. 28, 2002, both of the applications are incorporated by reference herein in their entirety.

FIELD OF THE INVENTION

The invention relates to a power station having at least one steam turbine and/or at least one gas turbine.

BACKGROUND OF THE INVENTION

One of today's major objectives to be met by technological means is to ensure the economical handling of available energy resources in generating and consuming power.

Power plants which are sizeable in terms of their installed generating capacity and which supply a large number of consumers and extensive geographical areas with electrical energy and district heat on a centralized basis are frequently employed to generate electrical energy and also to decouple district heat.

The centralized provisioning in this manner of electrical and thermal energy is cost-effective compared to decentralized provisioning employing a large number of smaller isolated plants and is particularly economical in operation.

Said known, what is termed combined heat and power generation is practically independent of the type of power station employed, the size of the power station, and the fuel used. The only crucial factor is for a heat source having a suitable primary-side temperature to be available for heating a heating medium. Hot water is today used almost exclusively as the heating medium.

To implement combined heat and power generation of the known type, heat that would otherwise have to be entirely or at least substantially dispersed unused into the surrounding area is usually decoupled from the power-plant process.

The heat source used for combined heat and power generation of this type can be, for example, steam from a steam turbine, which steam is taken, for instance, from a low-pressure section of the steam turbine. The heating medium can then be heated by the extracted steam through the latter's passing the condensation heat it contains to the heating medium by means of heat exchange.

This type of heat provisioning by means of combined heat and power generation of the kind described is especially economical because otherwise unused process heat is rendered usable, for example for heating buildings.

Contrary to the cited central provisioning with electrical and thermal energy, to generate refrigeration it is today known how to generate said refrigeration almost exclusively on a decentralized basis, mostly in block-type thermal power stations, or directly on site, mostly on the domestic premises themselves.

Said type of decentralized provisioning with refrigeration is very demanding in terms of cost and energy because either block-type thermal power stations have to be specially set up for the purpose of supplying consumers who have substantial refrigeration requirements or, in the case of refrigeration provisioning carried out directly on domestic premises, a large amount of electrical energy has to be expended in order to generate the required amount of refrigeration.

SUMMARY OF THE INVENTION

The object of the invention is therefore to specify an economical means of generating refrigeration.

Said object is achieved by providing a power station which is able economically to meet a substantial need for refrigeration alongside a need for mechanical (generally: electrical) energy and which can furthermore be flexibly employed and, in particular, will overcome the cited disadvantages of known equipment for generating refrigeration.

Said object is achieved according to the invention by means of a power station having at least one steam turbine, whereby to generate refrigeration at least one absorption-type refrigeration machine is linked to the steam turbine, with said absorption-type refrigeration machine being operated by means of steam taken from the steam turbine, preferably from a low-pressure section of said steam turbine.

The invention proceeds from a consideration of the fact that power stations which include a Rankine cycle offer very good initial conditions for integrating a refrigeration-generating device.

Owing to factors inherent in the system, power stations of this type employing a water-steam cycle contain a number of systems that can be used in a simple manner for coupling an absorption-type refrigeration machine.

To generate refrigeration it is customary to employ a cycle in which a liquid refrigerant (such as ammonia, for instance) is expanded such that it converts to the vaporous phase, then absorbing heat from a cooling chamber, a condensing-water cycle or another part of the system. The refrigerant vapor is then condensed and said heat is given off again outside the cited part of the system by means of cooling. Water is frequently used as the refrigerant for air-conditioning systems as at near-vacuum pressure it vaporizes at a temperature of approximately 4° C., meaning that an approximately 6° C. cold-water lead-in can be made available to a condensing-water cycle.

According to the principle on which absorption-type refrigeration machines operate, the coolant vapor is condensed by being absorbed in a solution (for example an aqueous lithium bromide solution if water is used as the refrigerant), then re-expelled by heating of the solution and converted into the liquid phase. This means that instead of a mechanical compressor, which is subject to wear-and-tear and consumes mechanical or, as the case may be, electrical energy, an expeller is employed which is operated predominantly (or even exclusively) using thermal energy, with dissipating of the heat absorbed during vaporization and expulsion now playing a decisive role.

Said heat dissipation can advantageously take place in a cooling tower or cellular-type radiator of the kind present in any event in many power stations, for example condensing power stations.

Just as in the case of generating heat for heating purposes, operating an absorption-type refrigeration machine requires the presence of a heat source preferably having a temperature of approximately 100° C. to 120° C. The present invention employs steam taken from the steam turbine as the heat source.

When the invention is employed in a gas turbine or gas-and-steam power station, another conceivable heat source is the hot exhaust gas of the gas turbine, said hot exhaust gas being extracted in its streaming direction, for example, behind or in the area of the end of a waste-heat boiler and used for the heat exchange with the heating medium.

The invention thus further leads to a power station which contains at least one gas turbine and in which at least one absorption-type refrigeration machine is linked to the gas turbine in order to generate refrigeration, with said absorption-type refrigeration machine being operated by means of waste heat from said gas turbine.

In a power station of this type the absorption-type refrigeration machine can advantageously be used, additionally or alternatively to refrigerating other consumers of refrigeration, for refrigerating intake air for the gas turbine.

Very many existing power stations containing a steam turbine will permit steam to be decoupled from the steam turbine by simple means and used to operate an absorption-type refrigeration machine. Existing power stations can thus in very many cases be expanded with modest effort to include the function of central refrigeration provisioning.

Apart from the necessary heat source for operating the absorption-type machine, said machine also contains components that have to be cooled. Examples of these include a container under vacuum containing the previously cited lithium bromide solution and requiring to be cooled, and a condenser connected upstream of the vacuum.

These types of components of the absorption-type refrigeration machine that require cooling can, for instance, be supplied with cooling water simultaneously with a condenser of the steam turbine, said condenser being present in any event and supplied with cooling water, with said cooling water being influenced by the ambient temperature and thus having a temperature for the cited cooling purposes that is sufficiently low. This can be, for instance, water taken from a river or other body of water in the vicinity of the power station. The surrounding area is thus a heat sink compared to the components requiring cooling so that cooling water which is kept in said heat sink and routed to the components being cooled is highly suitable for cooling purposes without the need for further measures for, for example, lowering the temperature of the cooling water. It is here that a major advantage of the invention can also be found, because in known devices for refrigeration provisioning on a decentralized basis the problem often arises of providing a suitable cooling medium which is capable of absorbing sufficient energy in cooling the components being cooled.

A further advantage of the invention is that absorption-type refrigeration machines are based on a robust and durable technology requiring at most the use of liquid circulating pumps and not involving any gas compression as in the known compression-type refrigeration machines. Absorption-type refrigeration machines therefore have virtually no moving parts in their major components and consequently have low maintenance requirements.

Absorption-type refrigeration machines furthermore require very little electrical energy themselves.

In an advantageous embodiment of the invention at least part of the steam taken from the steam turbine can be routed to a heat exchanger for heating a heating medium, preferably hot water.

In this embodiment of the invention the power station has been expanded in such a way as to provide heat generation alongside refrigeration generation, with steam taken from the steam turbine now being used to operate a heat exchanger, by means of which thermal energy is routed to consumers of heat, as well as the absorption-type refrigeration machine. Examples of said consumers of heat include heating devices, for, say, buildings, that are operated by means of a flow of hot water. The thermal energy needed to heat the flow of hot water is taken by means of heat exchange from the steam taken from the steam turbine.

Combined heat, power and refrigeration generation for the central provisioning of consumers with electrical energy, refrigeration and heat has clearly been implemented in this embodiment of the invention.

The expeller of the absorption-type machine can be operated directly using the extracted steam or indirectly by means of heat exchange using an expeller-heating medium, for example water. The extracted steam can also be routed to an air-conditioning system, with said system having a changeover device by means of which the extracted steam can be routed optionally to the expeller of the absorption-type refrigeration machine (for example for generating refrigeration in the summer for cooling purposes) or to the heat exchanger (for example for generating heat in the winter for heating purposes); the absorption-type refrigeration machine and/or heat exchanger are here included in the air-conditioning system.

In a further advantageous embodiment of the invention the power station furthermore includes at least one gas turbine whose waste heat is used for generating operating steam for the steam turbine, with its being possible for the absorption-type refrigeration machine to be used, additionally or alternatively to refrigerating other consumers of refrigeration, for refrigerating intake air of the gas turbine.

This embodiment of the invention is what is termed a gas-and-steam system which includes the absorption-type refrigeration machine for generating refrigeration.

When the gas turbine is operated, air is taken in which advantageously has to undergo cooling in order to enhance performance. In the present embodiment of the invention the absorption-type refrigeration machine's refrigeration generation is provided at least partially and/or temporarily for said cooling of the intake air, namely especially in cases of the power station's operation in which consumers requiring cooling that are linked to the absorption-type machine do not use up the absorption-type refrigeration machine's full refrigeration potential so that, consequently, surplus refrigeration is available which is then used for cooling the gas-turbine intake air.

The performance of the gas turbine is enhanced thereby. Variations in the quantity of refrigeration taken are also reduced thereby so as, in particular, to ensure that the absorption-type refrigeration machine operates evenly.

The proposed invention is suitable in all its embodiments for, for example, air-conditioning residential areas, large apartment blocks, office buildings, industrial parks, hotels, hospitals, public facilities etc. Preferred application sites for the invention can be, in particular, the earth's hotter climatic zones subject to such high ambient temperatures as to make air-conditioning necessary and/or desirable.

Further possible application sites include, for example, vacation centers in tropical and subtropical regions.

BRIEF DESCRIPTION OF THE DRAWINGS

An exemplary embodiment of the invention is presented in more detail below with reference to the drawing, in which.

DETAILED DESCRIPTION OF THE INVENTION

Figure 1:
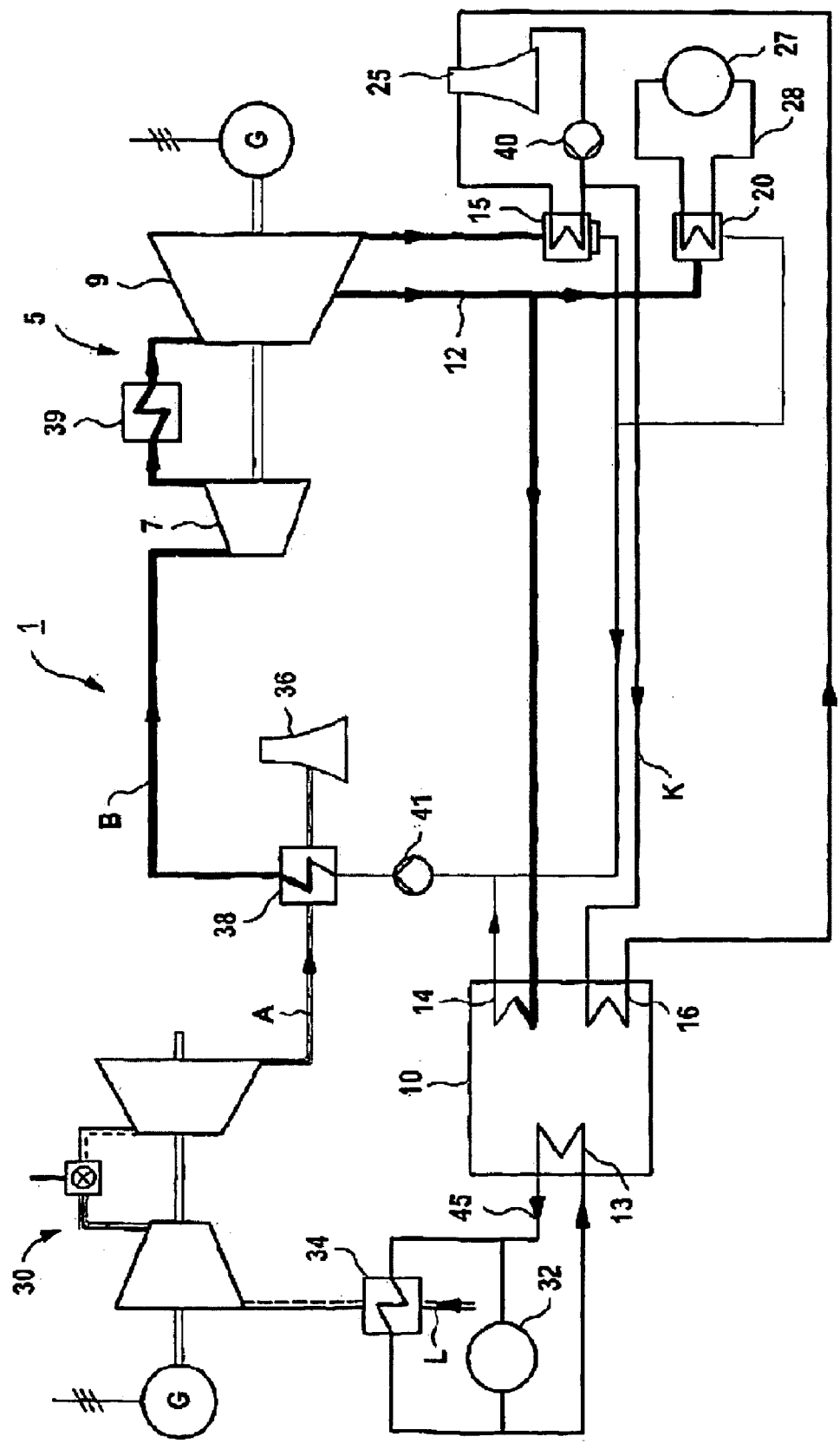
FIG. 1 shows a power station according to the invention embodied as a gas-and-steam system.

The figure is a schematic of a power station 1 according to the invention which is embodied as a gas-and-steam system and includes a steam turbine 5 and a gas turbine 30.

The operating steam B of the steam turbine 5 is made available by means of the waste heat A of the gas turbine 30.

The steam turbine 5 includes a high-pressure section 7 and a low-pressure section 9.

An absorption-type refrigeration machine 10 is operated by means of extracted steam 12 used as a heat source. Said extracted steam 12 is routed to an expeller 14 of the absorption-type refrigeration machine 10, said expeller sustaining the absorption process of the absorption-type refrigeration machine 10. The output of the expeller 14 is linked via a pump 41 to a heating surface 38 which is heated by the waste heat A of the gas turbine 30 in order to generate the operating steam B necessary for operating the steam turbine 5. The exhaust gas of the gas turbine 30 is routed after heat exchange with the heating surface 38 to a cooling tower 36.

In the example shown the absorption-type refrigeration machine 10 operates with a cycle for a lithium bromide solution which is circulated and thereby heated by the extracted steam for feeding out liquid water in the expeller 14 and is then re-cooled in a water vapor extractor 16 for the absorption of water vapor. The water vapor extractor 16 is thus a component requiring cooling and is supplied with cooling water K which is used, for example, in parallel for cooling a condenser 15 of the steam turbine 5 and is taken from, for instance, a cooling tower 25.

The high-pressure section 7 and low-pressure section 9 of the steam turbine 5 are mutually connected in the present exemplary embodiment via a heating surface 39 for intermediate overheating of the partially expanded steam, for example.

The steam turbine 5 and gas turbine 30 are each coupled to a generator G for generating electrical energy. Refrigeration is generated by means of the absorption-type refrigeration machine 10 by means of a vaporizer 13 which is under very low pressure, in particular pressure close to a vacuum. Water requiring to be vaporized by means of the vaporizer 13 will consequently be vaporized at a very low temperature, for example 4° C. The resulting steam is extracted from the vaporizer 13 by means of the water vapor extractor 16. Water ducted through the vaporizer 13 will as a consequence of the practically constant low temperature in said vaporizer be cooled to a value approximating said low temperature so that a stream 45 of lead-in cooling water for cooling consumers 32 of refrigeration is generated with a low constant temperature.

In the present embodiment of the invention the absorption-type refrigeration machine 10 is furthermore used to operate a cooling surface 34 by means of the stream of lead-in cooling water so that intake air L for the gas turbine 30 is cooled. This enhances the performance of the gas turbine. By combining the two measures, namely provisioning of the consumers 32 of refrigeration and cooling of the intake air L, it is also possible to achieve a constant quantity of refrigeration taken from the absorption refrigeration of the absorption-type refrigeration machine 10.

The extracted steam 12 from the low-pressure section 9 of the steam turbine 5 is furthermore used to heat a heating medium 28 by means of a heat exchanger 20 so that consumers 27 of heat can be supplied with thermal energy by means of the heating medium 28.

The embodiment of the invention shown in FIG. 1 hence implements combined heat, power and refrigeration generation suitable particularly for centrally provisioning a large number of consumers with the cited types of energy.

Similarly to the known long-distance thermal energy network associated with known combined heat and power generation, the invention further makes it possible to implement a long-distance refrigeration network for the central provisioning of refrigeration and hence to realize, for example, the air-conditioning of large building complexes having a substantial need for refrigeration.

This is of particular interest in the earth's hotter climatic zones where there is a substantial need for refrigeration and air-conditioning. Using the invention will ensure provisioning with electrical, thermal and refrigeration energy.

Figure 2:
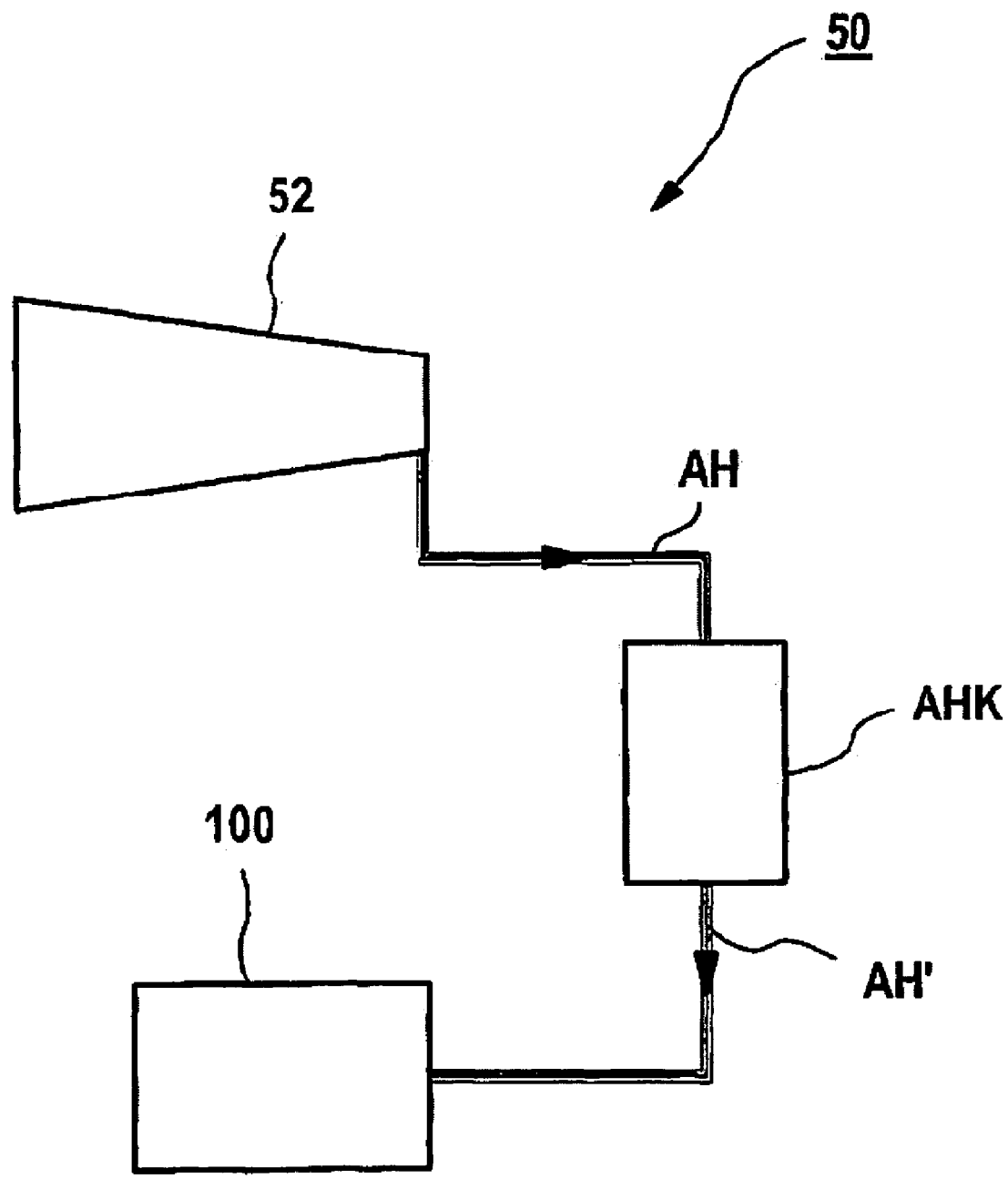
FIG. 2 shows a power station according to the invention having a gas turbine.

FIG. 2 shows a power station 50 according to the invention having a gas turbine 52 whose heat AH is routed to a waste-heat boiler AHK; the waste heat AH leaving the waste-heat boiler AHK is here used for operating an absorption-type refrigeration machine 100. The embodiment and further connection of the waste heat boiler are not shown in greater detail here, nor are further specifics of the power station 50.

The invention claimed is:

1. A method for using a power station for conditioning air, comprising:
    operating a steam turbine having a low pressure section;
    operating a gas turbine with waste heat therefrom used to generate operating steam for the steam turbine;
    fluidly connecting an absorption-type refrigeration machine to the steam turbine;
    extracting steam from the low-pressure section;
    using the extracted steam to operate the absorption-type refrigeration machine for centralized air-conditioning of a structure and
    fluidly connecting the absorption-type refrigeration machine to cool intake air for the gas turbine.

2. The method according to claim 1, wherein the structure is a building.

3. The method according to claim 1, wherein the structure is a plurality of buildings.

4. The method according to claim 1, wherein the structure is a housing at the power station.

5. The method according to claim 1, wherein at least a portion of the steam taken from the steam turbine is routed to a heat exchanger for heating a heating water.

6. A method for using a power station for generating refrigeration air, comprising:
    operating a gas turbine;
    operatively connecting an absorption-type refrigeration machine to cool intake air for the gas turbine; and
    operating the absorption-type refrigeration machine with waste heat from the gas turbine for centralized air-conditioning of a structure.

7. The method according to claim 6, wherein the structure is a plurality of buildings.

8. The method according to claim 6, wherein the absorption-type refrigeration machine is used additionally to refrigerate additional consumers of refrigeration.

* * * * *